United States Patent [19]

Quick

[11] 4,287,778

[45] Sep. 8, 1981

[54] HYDRAULIC VALVE FOR TWO-SPEED POWER TAKE-OFF DRIVE

[75] Inventor: David C. Quick, New Berlin, Wis.

[73] Assignee: Allis-Chalmers Corporation, Milwaukee, Wis.

[21] Appl. No.: 106,693

[22] Filed: Dec. 26, 1979

[51] Int. Cl.³ ............................................. F16H 37/00
[52] U.S. Cl. .................................. 74/15.4; 74/15.66; 74/364; 192/87.18
[58] Field of Search ...................... 74/15.2, 15.4, 15.6, 74/15.66, 11, 364, 752 C; 192/87.1, 87.11, 87.13, 87.14, 87.18

[56] References Cited

U.S. PATENT DOCUMENTS

| | | | |
|---|---|---|---|
| 2,920,732 | 1/1960 | Richards et al. | 192/87.18 X |
| 2,979,176 | 4/1961 | Voth | 192/87.18 X |
| 3,181,385 | 5/1965 | Siler | 74/364 |
| 3,279,275 | 10/1966 | Christie | 74/15.4 X |
| 3,352,165 | 11/1967 | Lee | 74/15.4 |
| 3,464,277 | 9/1969 | Longshore | 74/15.4 |
| 3,507,372 | 4/1970 | Gilbertson et al. | 74/15.4 X |
| 3,513,712 | 5/1970 | Zajichek et al. | 74/15.2 |
| 3,675,497 | 7/1972 | Thomas | 74/15.4 |
| 3,715,704 | 2/1973 | Boyle et al. | 74/15.4 |
| 3,991,629 | 11/1976 | Dearnley | 74/15.2 X |

FOREIGN PATENT DOCUMENTS 1192060  4/1965  Fed. Rep. of Germany ....... 74/15.4

Primary Examiner—C. J. Husar
Assistant Examiner—Moshe I. Cohen
Attorney, Agent, or Firm—Arthur L. Nelson

[57] ABSTRACT

A hydraulic valve for a two-speed power take off selectively operated by a reversible stub shaft providing the proper output drive.

12 Claims, 2 Drawing Figures

HYDRAULIC VALVE FOR TWO-SPEED POWER TAKE-OFF DRIVE

This invention relates to a power take-off drive and more particularly to a two-speed hydraulic clutch connected through a valve selectively operated by a reversible output stub shaft for the power take-off assembly. The stub shaft selectively positions the hydraulic valve to provide the proper output drive speed for the shaft end extending from the power take-off assembly for connection to an implement.

The conventional power take-off drives for a tractor operate at 540 or 1,000 rpm drive from the tractor to the implement. To accomodate use of either the standard 540 or 1,000 rpm drive the conventional coupling includes a reversible stud shaft which can be selectively positioned in the power take-off drive assembly to selectively connect the proper drive for the spline extending from the power take-off assembly. The conventional power take-off couplings are essentially mechanical and selectively connect to the proper drive by selective positioning a reversible stub shaft in the output of the power take-off assembly. Since hydraulic devices are used on the present tractors pressurized fluid is available on the tractor and hydraulic clutches do have some inherent advantages over the regular mechanical drive. This invention provides for means to selectively engage a two-speed power take-off assembly for driving through a hydraulic clutch at either of the 540 or 1,000 rpm's speed output. A reversible stub shaft is used to provide selective coupling to either an implement driven at the 540 speed or the 1,000 speed rpm. The reversible stub shaft positions a proper spline adapted for engagement to the implement for the selected speed while the inner portion of the reversible stub shaft positions the hydraulic valve for engaging the proper clutch of the power take-off assembly.

It is an object of this invention to provide a hydraulic valve for operating two-speed power take-off clutches.

It is another object of this invention to provide a hydraulic valve for operating a two-speed power take-off clutch assembly responsive to positioning of a reversible output stub shaft in the power take-off assembly.

It is a further object of this invention to provide a hydraulic valve coaxial with the two-speed power take-off clutches and operated by a reversible output stub shaft coordinating the clutch engaged with the spline end of the stub shaft extending from the power take-off assembly for connection to the implement.

The objects of this invention are accomplished by a two-speed hydraulic power take-off clutch rotating on a common axis with the power take-off output drive shaft means. The output drive shaft means includes a quill shaft receiving a hydraulic valve and a reversible stub shaft adapted for coupling with the implement. The valve is spring biased in a first direction and selectively and alternatively position against the force of the spring by the reversible stub shaft to one of two positions. The power take-off drive speed is coordinated with the spline end extending from the power take-off assembly and adapted for coupling with the implement. Accordingly, the drive speed is controlled by the clutch engaged. The spline end extending into the assembly operates the valve and clutch automatically by the positioning of the reversible stub shaft.

Referring to the drawings a preferred embodiment of this invention is illustrated.

Figure 1:
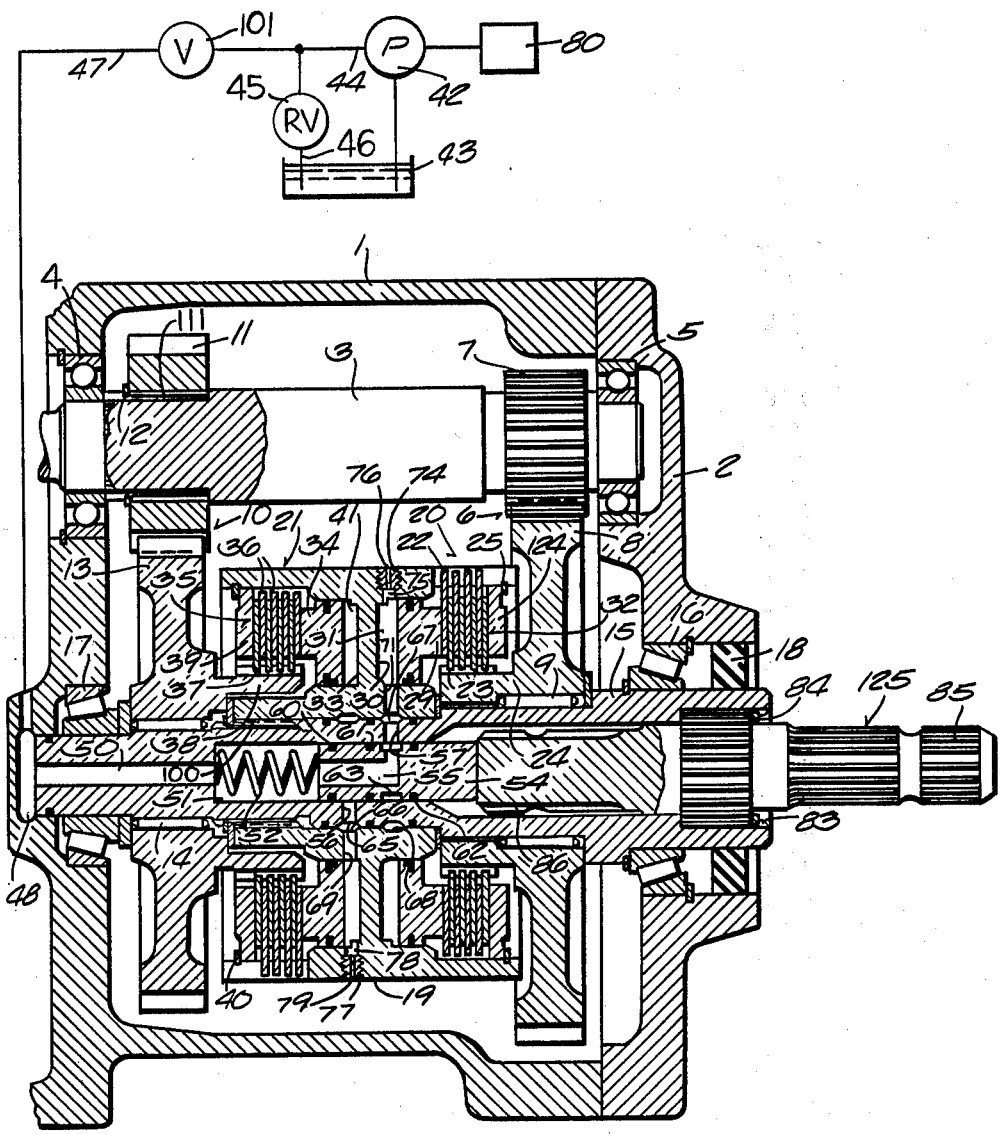
FIG. 1 is a cross section view of a power take-off assembly showing the low-speed clutch engaged.

The drawings illustrate a power take-off drive assembly including a housing 1 and cover plate 2 enclosing the assembly. The input drive shaft 3 is rotatably mounted in the bearing assemblies 4 and 5. The low-speed gear set 6 includes a drive pinon 7 and a driven gear 8. The drive pinon 7 is fixed to the input shaft 3 and the driven gear 8 is rotatably mounted on the bearing assembly 9.

The high-speed gear set 10 includes the drive pinon 11 which is fixed to the input drive shaft 3 by a spline connection 111 and a snap ring 12. A high-speed drive pinon 11 drives the gear 13 which is rotatably mounted on the bearing assembly 14.

The quill shaft 15 is rotatably mounted on the bearing assemblies 16 and 17. A seal 18 is provided on the end of the cover plate 2 for sealing the bearing assembly 16. The clutch carrier 19 is connected by spline 100 to the quill shaft 15. The clutch carrier 19 includes the low-speed clutch assembly 20 and the high-speed clutch assembly 21. The low-speed clutch assembly includes the clutch disks 22 which are carried on a spline of the carrier and selectively engage the clutch disks 23 on the clutch hub 24 of gear 8. A reaction plate 124 is held in position on the clutch carrier by the snap ring 25. A piston 29 operates within a cylinder 30 formed in the clutch carrier to form the pressurizing chamber 31. Pressurized fluid in the pressurizing chamber 31 engages the clutch pack 32 when the low-speed clutch is engaged.

The high-speed clutch assembly 21 includes a hydraulic cylinder 33 formed by the clutch carrier which receives the piston 34. The piston 34 operates against the clutch pack 35 which includes the clutch disks 36 mounted on a spline of the clutch carrier 19. The clutch disks 37 are mounted on the clutch hub 38 and engage the clutch disks 36. A reaction plate 39 is carried on the clutch carrier and retained in position by the snap ring 40. The piston 34 forms a pressurizing chamber 41 with the cylinder 33 and engages the clutch pack 35 when the high-speed clutch is actuated.

A portion of the hydraulic system is schematically illustrated. The pump 42 receives fluid from the sump 43 and pressurizes fluid in the conduit 44. A relief valve 45 is connected to conduit 44 and return conduit 46. Conduit 47 transmits fluid to the chamber 48 on the end of the quill shaft 15. The quill shaft 15 is formed with a longitudinal passage 50 which receives pressurized fluid from the conduit 47. The fluid passes through the spring chamber 51 which receives a spring 52 biasing the valve spool 54 in a righthand direction. The valve spool 54 is formed with a passage 55 with a radial portion selectively connected to radial passages 56 and 57 in the quill shaft 15. The seals 60, 61 and 62 are provided in the valve spool 54. Seals 61 and 62 are on both sides of the annular recess 63. Annular recess 63 is selectively in communication with the radial passages 56 and 57 when the clutches are engaged.

Annular recesses 65 and 66 are in communication with each other and formed in the external periphery of quill shaft 15 and the internal periphery of the clutch carrier 19. Similarly the annular recesses 67 and 68 are formed on the external periphery of the quill shaft 15 and the internal periphery of the clutch carrier 19. Annular recesses 65 and 66 are in communication with the radial passage 69 in the clutch carrier 19 to the high-speed hydraulic actuator 34 of the high-speed clutch 21. Similarly the annular recess 67 and 68 are in communication with the radial passage 71 of the pressurizing chamber 31 of the hydraulic actuator 29 of the low-speed hydraulic clutch 20.

A plug 74 in the passage 75 is formed with a bleed passage 76 permitting the release of pressurized fluid from the pressurizing chamber 31 when the low-speed clutch is disengaged. The plug 77 in the passage 78 is formed with a bleed passage 79 allowing the release of pressurized fluid from the pressurizing chamber 41 of the hydraulic actuator 34 of the high-speed clutch 21 when the clutch is released.

Figure 2:
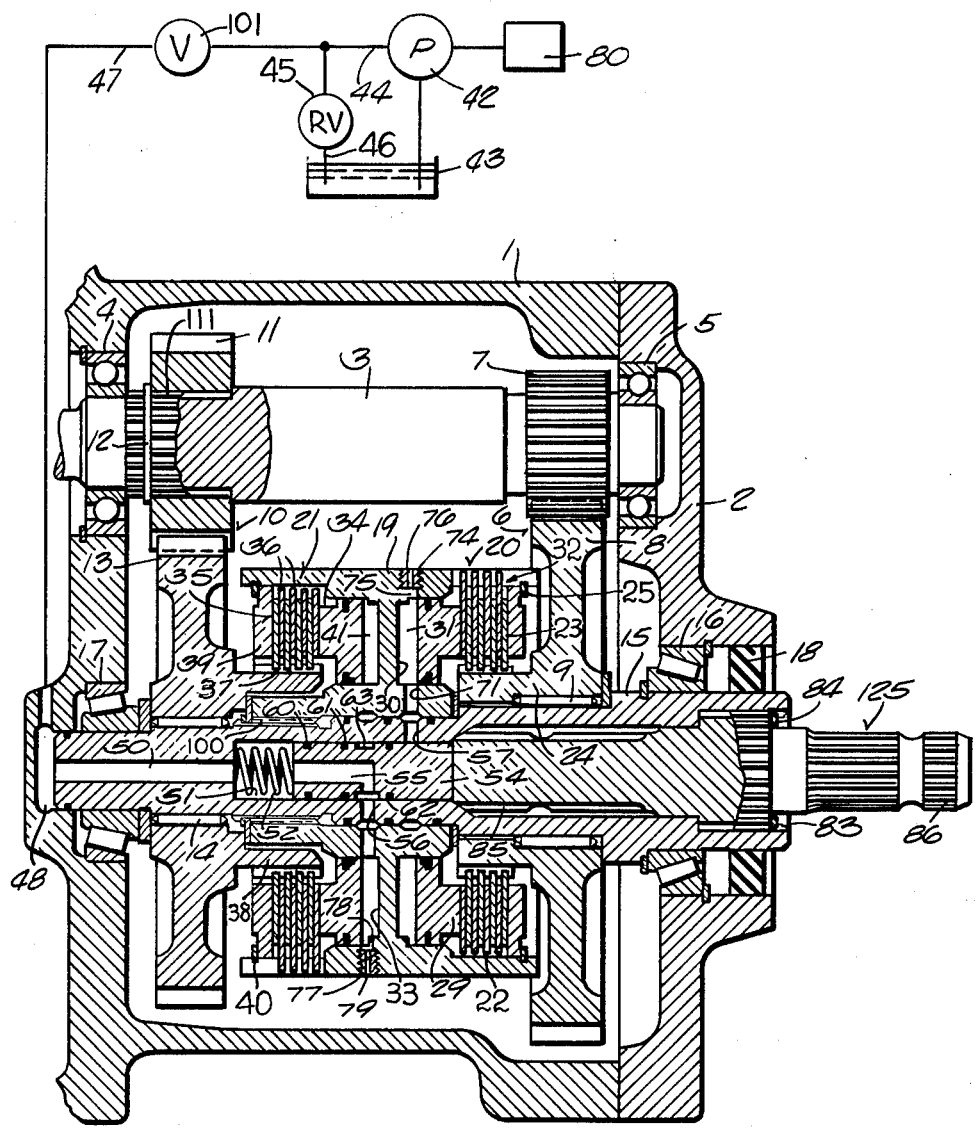
FIG. 2 is a cross section view of a power take-off drive assembly showing the high-speed clutch engaged.

The hydraulic valve of the hydraulicly actuated two-speed power take-off drive assembly operates in the following manner. A pump 42 is driven by suitable source of power such as an engine 80 to pressurize fluid in the conduit 44. Pressurized fluid in the conduit 44 is transmitted through conduit 47 control valve 101 and passage 50 to the spring chamber 51 and the passage 55 in the valve spool 54. Normally, the spring 52 biasing the valve spool in a righthand position against the reversible output power take-off shaft 125. The reversible output power take-off shaft 125 is fitted in a spline 83 in the internal periphery of the righthand end of the quill shaft 15 and is retained in this position by a snap ring 84. Since the output power take-off shaft 125 is reversible, it can be positioned with either end extending into the power take-off assembly. Each end of the shaft is of a different length and accordingly, this will permit spool 54 to assume each one of two positions depending on which end of the power take-off shaft 125 is extending into the assembly. The longer end 85 carries the 540 rpm spline or 6-toothed spline and extends into the power take-off assembly as shown in FIG. 2, while the shorter end 86 and 1,000 rpm 21-toothed spline extends from the power take-off assembly. The position shown in FIG. 2 biases the spool 54 to the lefthand position placing communication between the passage 55 of the valve and the radial passages 56 and 69 in the high-speed clutch assembly. This will actuate the high-speed clutch 21 for driving of the implement which is connected to the high-speed power take-off shaft end 86.

The reversible power take-off shaft 125 can be reversed to the position as shown in FIG. 1 in which position the shorter end or 1,000 rpm spline end is inserted into the power take-off assembly. This permits the spring 52 to bias the spool 54 in the righthand direction making communication between the passage 55 of the spool 54 with the radial passages 57 and 71 of the low-speed clutch assembly 20. When the low-speed clutch assembly is engaged pressurized fluid is transmitted to the pressurizing chamber 31 the 540 rpm spline end 85 extends from the power take-off assembly for connection with an implement. Accordingly, the spline end adapted for driving an implement at the 540 speed rpm, extends from the power take-off assembly when the low-speed clutch 20 is driving the power take-off. Conversely, when the high-speed clutch 21 is driving the high-speed spline end 86 is extending from the clutch assembly.

The embodiments of the invention in which an exclusive property or privilege is claimed are defined as follows:

1. A two-speed power take-off drive for a tractor comprising, an input shaft, an output shaft means, a first and a second gearset for selectively driving between said input shaft and said output shaft, a first and a second hydraulic clutch and a hydraulic valve for selectively engaging one of said two first and second gearsets, a reversible stub shaft in said output shaft means operating said valve responsive to selective and alternative positioning of said reversible stub shaft for selective operation of said clutches operating said power take off drive in each of two speeds.

2. A two-speed power take-off drive for a tractor as set forth in claim 1, wherein said output shaft means receives said hydraulic valve for reciprocal movement for selectively engaging each of said two clutches.

3. A two-speed power take-off drive for a tractor as set forth in claim 1, wherein said output shaft means includes a quill shaft receiving said valve, a spring biasing said valve in one direction, said reversible stub shaft biasing said valve against the force of said spring to selectively position said valve in each of two positions.

4. A two-speed power take-off drive for a tractor as set forth in claim 1, wherein said reversible stub shaft define a spline on each end of said shaft for selectively coupling said shaft with an implement.

5. A two-speed power take-off drive for a tractor as set forth in claim 1, wherein said output shaft means includes a quill shaft receiving said reversible stub shaft for selectively driving an implement.

6. A two-speed power take-off drive for a tractor as set forth in claim 1, including a clutch carrier for carrying said two clutches, means rotatably supporting said clutch carrier and said output shaft means for rotation about a common axis.

7. A two-speed power take-off drive for a tractor as set forth in claim 1, including means rotatably supporting said output shaft means for rotation about an axis, said output shaft means defining a quill shaft and said reversible stub shaft, said quill shaft defining an opening receiving said valve for selectively reciproating in each of two positions for selectively actuating each of said clutches.

8. A two-speed power take-off drive for a tractor as set forth in claim 1, wherein said output shaft means defines a quill shaft receiving said reversible stub shaft, a central opening in said quill shaft receiving said valve, a spring biasing said valve in a first direction against the force of said reversible stub shaft for selectively positioning said valve for selectively engaging each of said clutches.

9. A two-speed power take-off drive for a tractor as set forth in claim 1, wherein said input shaft defines an axis of rotation, said output shaft means defines an axis of rotation parallel with said input shaft means.

10. A two-speed power take-off drive for a tractor as set forth in claim 1, wherein said reversible stub shaft defines a spline adapted for connection to an implement for driving the implement at a low-speed, a spline on the opposite end of said shaft for driving an implement at a high-speed.

11. A two-speed power take-off drive for a tractor set forth in claim 1, wherein said output shaft means includes a quill shaft receiving said reversible stub shaft.

12. A two-speed power take-off drive for a tractor as set forth in claim 11, wherein said output shaft means defines hydraulic fluid passage means, said valve received in a central opening of said quill shaft, a clutch carrier rotatably mounted for rotation on a common axis with said output shaft means, passage means in said clutch carrier between said quill shaft and each of said clutches, passage means in said quill shaft for selectively connecting said passage in said valve and with each of said clutches for selectively engaging each of said clutches.

* * * * *